Sept. 25, 1962  C. P. PORTERFIELD  3,056,065
SPARK MACHINING METHODS AND APPARATUS
Filed June 23, 1959  2 Sheets-Sheet 1
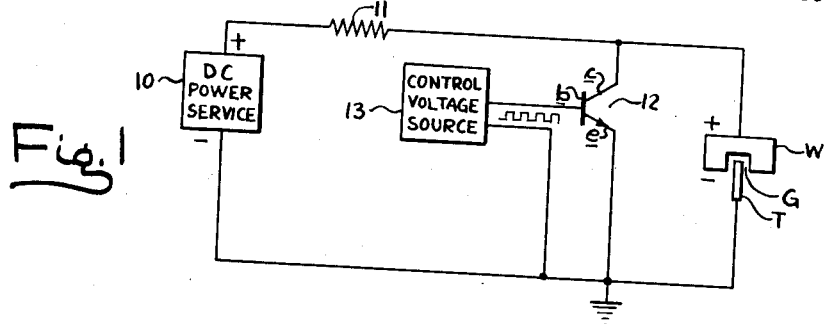
Fig. 1
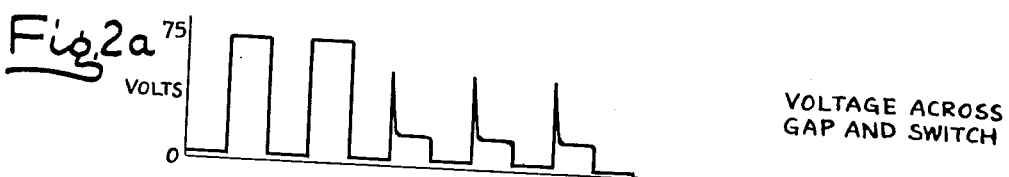
Fig. 2a — VOLTAGE ACROSS GAP AND SWITCH
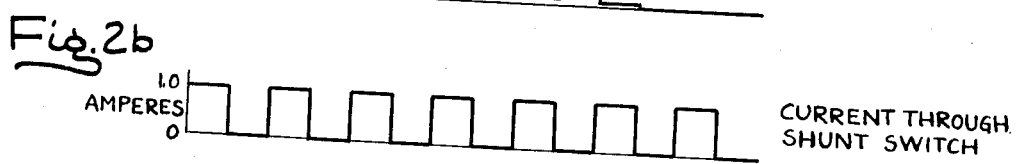
Fig. 2b — CURRENT THROUGH SHUNT SWITCH
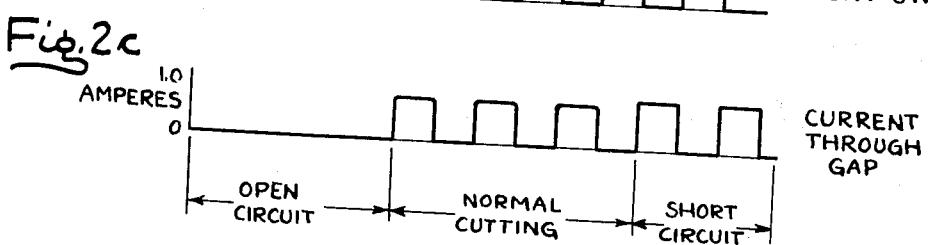
Fig. 2c — CURRENT THROUGH GAP
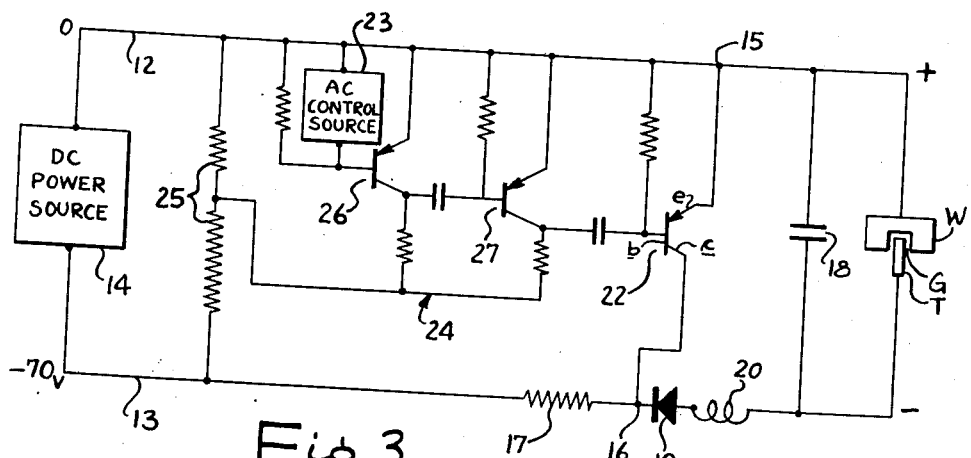
Fig. 3
INVENTOR
CECIL P. PORTERFIELD
by: Wolfe, Hubbard, Voit & Osann
ATTYS Sept. 25, 1962      C. P. PORTERFIELD      3,056,065
SPARK MACHINING METHODS AND APPARATUS
Filed June 23, 1959      2 Sheets-Sheet 2
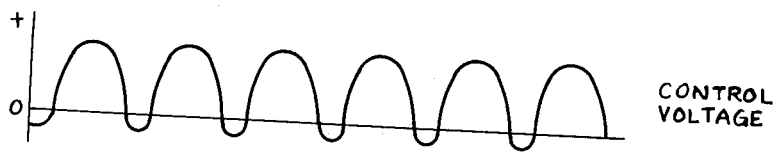
Fig. 4a — CONTROL VOLTAGE
Fig. 4b — VOLTAGE ACROSS SHUNT-SWITCH TRANSISTOR
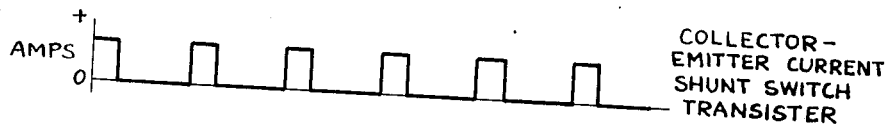
Fig. 4c — COLLECTOR-EMITTER CURRENT SHUNT SWITCH TRANSISTER
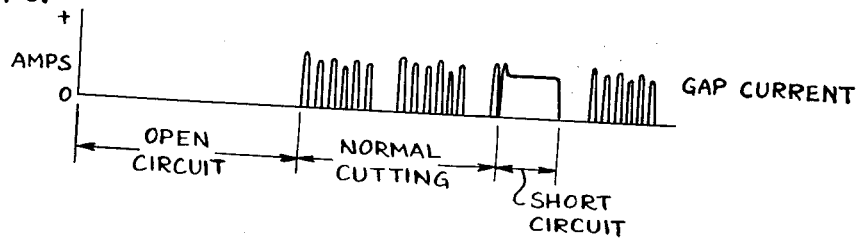
Fig. 4d — GAP CURRENT
OPEN CIRCUIT | NORMAL CUTTING | SHORT CIRCUIT
INVENTOR
CECIL P. PORTERFIELD
by: Wolfe, Hubbard, Voit & Osann
ATTYS.

United States Patent Office 3,056,065
Patented Sept. 25, 1962

3,056,065
SPARK MACHINING METHODS AND APPARATUS
Cecil P. Porterfield, Pittsburgh, Pa., assignor to Elox Corporation of Michigan, Troy, Mich., a corporation of Michigan
Filed June 23, 1959, Ser. No. 822,270
12 Claims. (Cl. 315—207)

This application relates to spark machining methods and apparatus particularly as they relate to fine finishing of the spark machined workpiece.

In spark machining, overvoltage initiated electric discharges through an ionizable dielectric fluid in a spark gap defined between a cathodic electrode tool and an anodic conductive workpiece dislodge particles from the latter to machine it. This process is particularly advantageous for working hard metals, such as tungsten carbide and alloy steels, which are machined only with difficulty if at all by economic conventional procedures. To maintain the high-current densities associated with useful machining and prevent deterioration of the discharge into a thermal or welding arc, the discharges are short and time-spaced. Capacitively stored energy has often been employed to provide the high current discharge pulses required.

Deionization of the dielectric separating the tool and workpiece after an initial discharge is necessary to separate the discharges. Effective disconnection of the voltage of the supply energy is required during the desired deionization period. This usually involves operation of capacitor charging or discharging switches under difficult conditions in view of the reactances involved, or it may involve capacitor charging impedances which also increase the capacitor charging time. While the switching problem is not as acute for small energy discharges associated with finish cutting as it is for the larger roughcutting discharges at any given repetition rate, the difficulty increases as higher repetition rates are sought.

In accordance with the invention, it is a principal object to provide simple and effective methods and apparatus for assuring rapid deionization of spark discharges. It is also an object to provide high repetition rate spark machining method apparatus particularly useful for fine-finishes of spark machined surfaces. It is a particular object to reduce the spark machining switching duty requirements for quenching the ionized spark gap without prolonging the spark discharges. It is a further object to increase the discharge repetition rate for discharges of given duration. Still further objects are to eliminate capacitor storage devices, or to eliminate switching means in series with the spark gap, or both.

Other objects and advantages will become apparent as the following description proceeds taken in conjunction with the accompanying drawings in which, FIGURE 1 is a circuit diagram of a first embodiment of a spark machining apparatus incorporating the invention;

FIGS. 2a, 2b and 2c illustrate the operation of the FIG. 1 apparatus;

FIG. 3 is a diagram of a second circuit embodying the invention; and

FIGS. 4a, 4b, 4c and 4d illustrate the operation of the FIG. 3 apparatus.

While the invention has been shown and is described in some detail with respect to particular embodiments and modifications thereof, there is no intention that it should be limited to such detail. On the contrary, it is intended here to cover all modifications, alternative constructions and equivalents falling within the spirit and scope of the invention as defined by the appended claims.

First Method of Practicing the Invention

In a first method of practicing the invention, a direct current voltage is applied across the ionizable dielectric fluid in a spark gap defined between a workpiece and electrode. The polarity is selected to make the workpiece positive with respect to the electrode and the voltage is made high enough to cause sparkover. At the very small gap spacings associated with fine-finish machining, voltage sources of the order of forty to seventy volts have been sufficient, and at the low discharge currents required (in the order of one ampere or less), small portable or hand-held sources are both adequate and safe for some operations.

For example, the workpiece may be a sintered carbide cutting tool whose sharp edges are to be rounded off to prevent unnecessary stress concentration during the use of the tool. The electrode tool may be a simple handheld brass block coated with a semisolid dielectric such as a microcrystalline wax or a grease. When the block is placed against the carbide tool or other workpiece edge or made to slide over it, the dielectric itself serves to mechanically maintain the gap spacing. Such ionizable dielectrics, although mechanically semisolid at room temperature, are sufficiently fluid, particularly in the discharge area, to rupture or break-down upon sparkover and to subsequently heal or self-restore to their deionized state. They are not themselves a part of the instant invention and are here intended to be embraced within the term "dielectric fluid."

In particular accordance with the invention, the discharge is terminated by providing a low resistance path shunting the spark gap. The source current is switched through the shunt path without having to mechanically switch open the conductors in series with the gap electrodes. The shunt path voltage drop is less than that required to maintain gap ionization. For example, with kerosene as the dielectric, a gap voltage in the vicinity of 20 volts may be required to maintain ionization. While the gap current may vary, the gap voltage remains very nearly a given percentage or proportion of the no-load source voltage. By providing the shunt path with a resistance which is a smaller percentage of the total circuit resistance when the gap is open, deionization upon closing the shunt path is assured. If the source resistance is itself low and also if the source voltage is very many times higher than the gap deionization voltage, the shunt path resistance will be so low as to be essentially a short circuit.

It has been found that the deionization time is very short under the low voltage and relative transient-free switching conditions achieved by so "starving" the discharge. Indeed, and contrary to usual spark machining practice in which a charged capacitance is discharged through a spark gap, the period that no voltage is applied across the gap may be much short than the period that voltage appears across it. For example, the discharge or "on" period may be selected at a preferably uniform value from 10 to 50 microseconds and the "off" period (during which the gap is shunted) may be set at only 5 microseconds. During the period the gap is shunted, the energy of the shunted current must be dissipated, and the shunting period is desirably not longer than the unshunted period. If the switch on-time is made small with respect to its offtime, the high duty cycle of the gap (and low duty cycle of the shunt switch) results in an increased rate of machining for a given power supply.

Apparatus for Practicing the First Method

Referring now to FIG. 1, a novel low-power spark machining circuit for practicing the method is illustrated. As shown, a direct current power source 10 is connected through a charging impedance 11 to the workpiece W and tool T defining the gap G between them. To minimize reactance and resulting switching transients, most or all of the impedance 11 is preferably resistance, which, with the varying resistance of the gap during discharge, limits the current to a desired safe maximum value. If the source 10 has a high internal resistance sufficient to protect both the source or workpiece finish in case of a sustained short circuit between the tool and workpiece, the separate external impedance may be omitted.

The shunt switch itself may take several forms. As a practical matter the requirement of high repetition rates, low switch resistance, and desired circuit simplicity make the transistor 12 a desired choice. The transistor emitter $e$ and collector $c$ form the switch electrodes, and the base $b$ serves as the control electrode. An alternating control source 13. preferably having a square wave output, operates the transistor 12 as an on-off shunt switch.

The switching transistor is of the junction type, and as shown has a N-P-N polarization. Its collector $c$ is connected to the positive workpiece W and its emitter $e$ is connected to the negative electrode tool T. The transistor 12 so connected acts as a switch in which substantially short-circuited positive current flows from the collector to the emitter when a sufficiently positive voltage is applied to the base with respect to the emitter electrode or the collector electrode. Such a switch operation is usually called the saturated mode of the transistor, provided the control voltage amplitude is sufficiently high so that energy dissipation in the transistor is held low, despite the high current, by the very low voltage drop.

No storage capacitor is used inasmuch as the discharge period is as long or longer than the switch "off" period available as storage time. With reactance minimized, the switching duty is light. Repetition rates in terms of kilocycles or higher per second are readily available.

FIGURES 2a, 2b, and 2c illustrate both the results of the method and the equipment operation. With open-circuit conditions, the voltage across the gap G follows the square wave or on-off switching pattern of the control voltage source as shown in the first two pulses in FIG. 2a. A control voltage in the vicinity of 5 to 10 volts is usually ample for efficient operation of a switch shunting, for example, a 70 volt source. The current through the switch follows a uniform pattern as shown in the "on" periods of FIG. 2b regardless of the gap conditions (except that during gap short circuit the current may be divided between the switch and the shorted electrodes). The shunt switch current amplitude may be, for example, one ampere. At normal gap spacings, as shown during the third, fourth, and fifth pulses of FIG. 2a, the gap voltage drops rapidly to about 20 volts, and the remaining 50 volts drop is due to current flow through the source resistances represented by resistor 11. It is this low gap voltage across which the switch contacts usually close. The gap current is shown in FIG. 2c.

Short circuit current is slightly higher than the normal cutting current and has an amplitude equal to the shunt current carried by the switch. While the power source could equally well provide continuous cutting current or short circuit without interruption by reason of the switch current, the advantage lies in the preservation of desirable spark machining conditions. The discharge is very effectively interrupted so that it may reform instead of becoming a continuous heating arc.

In view of the neglible transient switching voltages, the percentage of switch off-time may be decreased with respect to any given switch on-time until the gap deionization time is approached. This time is basically very short with the small gap spacings (typically less than .001 inch) and the discharge cooling or quenching effect provided by the fluid dielectric.

*Second Method of Practicing the Invention*

For finishing operations, an oscillatory discharge may also be employed without employment of switching means in establishing the repetition rate upon application of a direct current voltage. For this purpose, the unidirectional voltage is applied to a capacitor which is in turn connected across the sparking gap. The capacitor charges and discharges in a relaxation mode with frequencies up hundreds of kilocycles per second available.

In accordance with the second method, the train of oscillations is periodically interrupted without disconnecting the voltage supply from the energy storage means or from the gap by periodically shunting the capacitor charging current.

Preferably charging current is directed to the capacitor and gap through a unidirectionally conducting path. At least a portion of this path is located between the shunt path and the capacitance to block reverse current flow from the capacitor through the shunt path. When the gap spacing is so wide as to present open circuit conditions, the shunt path thus need not accommodate current from the capacitor as well as from the source. Both the capacitor and gap are effectively isolated from the source by the switching action of the shunt.

With the oscillation frequency producing, for example, some 50,000 discharges per second, the shunt path may be closed at a rate, for example, of 500 times per second, preferably with a higher closed period than open period. Trains of oscillatory discharges are thus interrupted briefly without actually disconnecting the voltage supply. The closing time of the switching means constituting the shunt path should, of course, be sufficient to deionize the spark gap and the impedance of the shunt path at such times must be sufficiently low so that a voltage less than gap ionization potential is maintained across it.

To increase the effectiveness of the power source without simultaneously increasing the switching requirements of the shunt path, the applied voltage is preferably doubled or otherwise mulitplied at the capacitor. This is readily facilitated by the use of unidirectional blocking means in conjunction with distributed inductances. A higher voltage than that appearing across the shunting switch is thus available for greater assurance of rapid gap sparkover.

It will be appreciated that in superimposing a shunt path at a repetition rate less than that of the spark discharge, timing of the individual spark discharges is not sought. The interruption of trains of discharges by assured deionization periods provides a measure of control without limiting the discharge repetition rate to that feasible for opening and closing the shunt path.

*Apparatus for Practicing the Second Method of Invention*

FIG. 3 illustrates an exemplary apparatus for practicing the second method previously described. A relaxation oscillator apparatus is shown in which a capacitor is charged until it reaches a sufficient voltage to cause sparkover and discharge through the spark gap. In this way, a continuously connected direct current source provides repetitive discharges.

As shown therein a direct current source 14 is positive and negative supply terminals 15 and 16 respectively. Current limiting resistance 17 is shown and included in the negative supply line. A storage capacitor 18 is connected to the terminals through a rectifier 19 and charge inductance 20. The rectifier 19 is poled to block reverse current flow so that voltage induced across the inductor 20 can be employed to charge the capacitor to voltages higher than that of the source. The spark gap G is connected in shunt across the capacitor 18, the workpiece W being connected to the positive capacitor terminal and the tool T being connected to the negative terminal.

While resistor 17, either as a separate resistor or representing internal resistance of the power source 14, helps to limit the current flowing between the tool and workpiece in the event of a short circuited gap, it does not hold off source voltage from the gap to afford the fast deionization between discharges desired for high repetition rates.

As further shown in FIG. 3, a shunt switch 22 is connected across the power supply terminals. As described in connection with the FIG. 1 apparatus, the desired low resistance closed-switch condition is well served by a transistor and the switch is so represented. A shunt switch control means may take the form of alternating current control voltage source 23 as input for a pulse squaring circuit 24. The latter is suitably energized from the direct current source 14 through a voltage divider 25. With such a system, a conveniently obtainable sinusoidal alternating source having a frequency equal to the desired shunt switching rate may be employed to operate the transistor shunt switch without unnecessary energy dissipation within the transistor switch in the course of operation.

Briefly, the exemplary FIG. 3 control circuit 24 employs first and second base-input common-emitter transistor amplifier stages 26 and 27 which are over-driven to square the initially sinusoidal input pulse. By including a direct current bias means with the source 23, either in the form of a series direct current bias source or an input bias resistor, only a part of alternative half waves becomes effective to drive the first amplifier 26 into conduction. In this way, for a given repetition rate, the ratio of on-time to off-time of the shunt switch 22 is easily controlled. With the transistor 22 polarized P-N-P, the base is rendered negative with respect to the emitter at a fast time rate to cause emitter-to-collector electrode conduction of the shunt switch.

As shown in FIGS. 4a to 4d, the shunt switch operation enforces a less-than-ionization potential across the gap at periodic intervals. FIG. 4a illustrates a bias control voltage input to the wave squaring circuit chosen in this instance to provide an output control signal for a switching cycle in which the shunt switch conducts for one-fourth of the time and is open the remaining time. The source voltage is thus dropped to zero or near zero for a quarter of the time as shown in FIG. 4b. The current drawn by the shunt circuit path is illustrated in FIG. 4c. It is limited by the source resistance 17 and is independent of the spark gap.

The gap current, which can flow only in the intervening periods, requires breakdown of the ionizable dielectric fluid whereupon the capacitor discharge pulse occurs. Corresponding gap voltage and gap current pulses are shown in FIGS. 4b and 4d. Only when open-circuit conditions prevail does the shunt switch close on the full source voltage; otherwise the switch closes when the gap voltage is at a lesser voltage. Synchronization of the shunt switch and the relaxation circuit is unnecessary.

I claim as my invention:

1. The method of spark machining by short, time-spaced over-voltage initiated discharges through an ionizable dielectric-filled spark gap defined between a conductive workpiece and an electrode tool which comprises maintaining a continuous voltage supply circuit to said gap and periodically shunting the supply circuit and gap to reduce the voltage applied to the spark gap below its ionization potential.

2. In the art of spark machining a conductive workpiece by short, time-spaced over-voltage initiated discharges through an ionizable dielectric-filled spark gap defined between the workpiece and an electrode tool, which method comprises continuously maintaining a direct current supply across the gap with a voltage sufficient to initiate a discharge, and effectively opening the supply circuit by periodically short circuiting the supply to reduce the voltage across the gap to a value below the gap ionization potential.

3. The method of spark machining by short, time-spaced spark-over discharges through an ionizable dielectric-filled spark gap defined between a conductive workpiece and an electrode tool which comprises placing the workpiece at a sufficiently high positive potential with respect to the electrode tool to initiate a discharge, and interrupting the discharge by periodically shunting the gap to reduce the voltage at the gap below the level required to maintain ionization.

4. The method of providing short, time-spaced over-voltage initiated spark-machining discharges through an ionizable dielectric-filled spark gap defined between a conductive workpiece and an electrode tool which comprises applying a direct current voltage across the gap at a sufficiently high level to initiate and maintain a discharge thereacross, and periodically interrupting the discharge by shunting the gap with a low resistance path.

5. The method of spark machining a conductive workpiece by short, time-spaced over-voltage initiated discharges through an ionizable dielectric-filled spark gap defined between the workpiece and an electrode tool, which method comprises applying a voltage supply across said gap having a sufficient level to initiate and maintain a gap discharge, and repetitively interrupting the discharge by shunting the gap for periods shorter than the periods the discharge is maintained.

6. In the art of spark machining a conductive workpiece the steps of creating a series of short, time-spaced over-voltage initiated discharges through an ionizable dielectric-filled spark gap between the workpiece and an electrode tool by charging a capacitive energy storage means from a voltage supply and discharging the storage means through the spark gap when the voltage charge reaches a gap ionization value, and periodically interrupting the series of discharges by short-circuiting the energy storage means to reduce the voltage applied across the storage means and the gap to a value below that required to maintain ionization.

7. Apparatus for time-spacing overvoltage-initiated machining discharges through an ionizable dielectric-filled spark gap defined between a conductive workpiece and an electrode tool comprising means for applying a positive voltage to the workpiece with respect to the tool, switch means shunting the spark gap, and means for periodically closing and opening the switch to periodically reduce the voltage across the gap to a value below the gap ionization potential.

8. In an apparatus for machining a conductive workpiece by a succession of short, time-spaced overvoltage initiated discharges through an ionizable dielectric-filled spark gap defined between the workpiece and an electrode tool, means for connecting a direct current voltage source across the gap, and means for periodically shunting the gap to reduce the gap voltage below ionization potential.

9. Apparatus for machining a conductive workpiece by a series of short, time-spaced overvoltage initiated discharges through an ionizable dielectric-filled spark gap defined between the workpiece and an electrode tool which comprises means for connecting a direct current voltage source across the gap to initiate a discharge thereacross, and means for periodically opening and closing shunt path across the voltage source having a sufficiently low resistance to reduce the voltage across the gap below its ionization potential, the open time of said shunt path being at least equal to the closed time of said shunt path.

10. Apparatus for spark machining a conductive workpiece by a series of spark discharges through an ionizable dielectric filled spark gap defined between the workpiece and an electrode tool which comprises a capacitive energy storage means connected across the gap, means for connecting a direct current source to the storage means through a charging impedance to provide a series of discharges through the spark gap, and means for periodically interrupting the series of discharges comprising a periodic switch shunted across the direct current source.

11. The combination as set forth in claim 7 in which said switch means comprises a transistor having its principal electrodes connected across the gap and said means for opening and closing the switch comprising a source of square wave pulses connected to the control electrode of said transistor.

12. The combination as set forth in claim 10 in which said periodic switch comprises a transistor having its principal electrodes shunted across said direct current source and its control electrode operatively connected to a source of alternating current.

References Cited in the file of this patent

UNITED STATES PATENTS

| 2,835,784 | Williams | May 20, 1958 |
| 2,919,382 | Saxenmeyer | Dec. 29, 1959 |
| 2,951,930 | McKechnie | Sept. 6, 1960 |

FOREIGN PATENTS

| 325,540 | Switzerland | Nov. 15, 1957 |